United States Patent [19]

Bailey

[11] Patent Number: 5,793,467
[45] Date of Patent: Aug. 11, 1998

[54] SEMI-PERMANENT READING LENSES FOR SUNGLASSES

[75] Inventor: Dean Bailey, 8900 Hilloway Rd., Eden Prairie, Minn. 55347

[73] Assignee: Dean Bailey, Eden Prairie, Minn.

[21] Appl. No.: 721,250

[22] Filed: Sep. 26, 1996

[51] Int. Cl.⁶ .................................................. G02C 7/06
[52] U.S. Cl. .................................................. 351/172
[58] Field of Search ........................................ 351/172

[56] References Cited

U.S. PATENT DOCUMENTS 5,349,393  9/1994  Kraft ........................................ 351/172
5,478,824  12/1995  Burns et al. ............................ 351/172

*Primary Examiner*—Frank G. Font
*Assistant Examiner*—Jason D. Vierra-Eisenberg
*Attorney, Agent, or Firm*—Schwegman, Lundberg, Woessner & Kluth, P.A.

[57] ABSTRACT

A plastic reading lens using a microstructure to provide reading correction can be semi-permanently attached to a non-prescription sunglass using a water-soluble adhesive. The lens may be removed from the sunglass using an adhesive remover which is non-damaging to plastic or glass. The microstructure lens may also be applied to the sunglasses using a non-adhesive molecular attraction mechanism.

5 Claims, 1 Drawing Sheet

SEMI-PERMANENT READING LENSES FOR SUNGLASSES

TECHNICAL FIELD OF THE INVENTION

The present invention related generally to prescription sunglasses, and more particularly to method and apparatus for affixing semi-permanent reading lenses to non-prescription sunglasses.

BACKGROUND OF THE INVENTION

Many people will have sufficiently good vision to permit them to use non-prescription sunglasses. However, many such people require a correction for reading. Therefore, it would be desirable if non-prescription sunglasses could be customized with a reading lens, thus providing a bifocal sunglass with a non-prescription lens for viewing at a distance, and the appropriate lens correction for reading.

One such product, called Optx 20/20, available from Neoptx, Inc., of Redmond, Wash., 98052, provides a removable reading lens which can be applied to a non-prescription sunglass. The Optx 20/20 lens is applied to the inside of the sunglass lens surface with clear water and sticks to the sunglass through a molecular attraction. The Optx 20/20 lenses can be removed by peeling them off, leaving no adhesive residue on the lens, and allowing reuse at a later time.

The present invention provides an alternative to the Optx 20/20 removable reading lenses, with certain advantages.

SUMMARY OF THE INVENTION

The present invention provides a semi-permanent reading lens formed of plastic using microstructures produced by a process called microreplication. A plastic reading lens is attached to a non-prescription sunglass such that the reading lens provides a reading correction using microstructures in the reading lens. A water-soluble adhesive applied to one surface of the lens permits attachment of the lens to a non-prescription sunglass surface. A method for providing a reading lens correction to a non-prescription sunglass according to the present invention comprises the steps of: (a) providing a reading lens constructed of plastic with a reading correction created with microstructures; and (b) affixing the reading lens to the pair of non-prescription sunglasses using a water-soluble adhesive. The method further includes the step of removing a lens affixed to a non-prescription sunglass using an adhesive remover which is non-damaging to plastic or glass.

DETAILED DESCRIPTION OF THE PRESENT INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
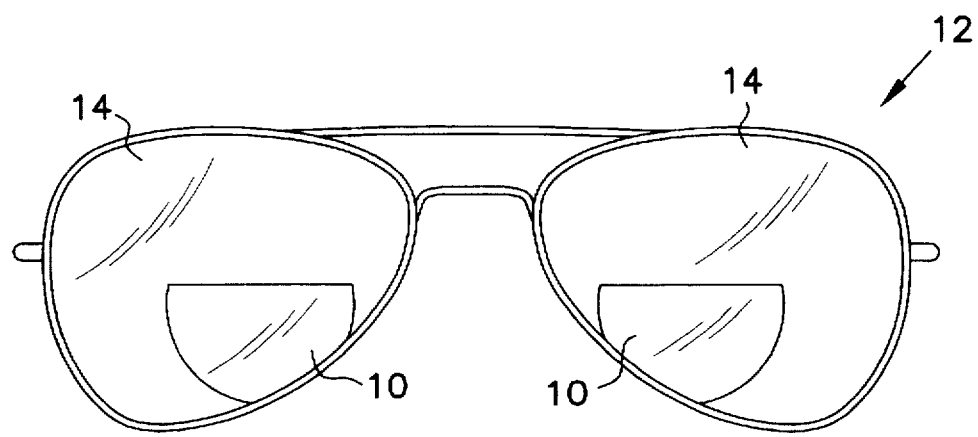
FIG. 1 shows a front view of the lens system according to the present invention.
Figure 2:
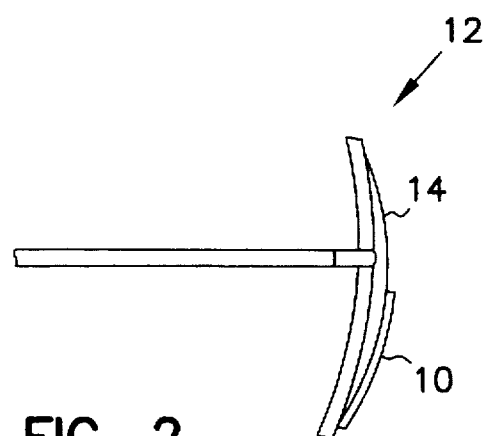
FIG. 2 shows a side view of a semi-permanent lens affixed to a non-prescription sunglass according to the present invention.
Figure 3:
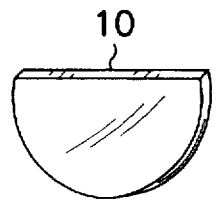
FIG. 3 shows a reading lens according to the present invention.

As shown in FIGS. 1–3, the present invention provides a semi-permanent, clear lens 10 affixed, as described further below, to a pair of non-prescription sunglasses 12 having a pair of non-prescription tinted lenses 14. Lenses 14 may be constructed of either glass or plastic and tinted in any desired color, but preferably include UV protection and/or polarization.

Lenses 10 are constructed of a flexible plastic membrane or film, wherein the reading glass correction is provided by "microstructures" as described in U.S. Pat. Nos. 4,576,850, 4,582,885, and 4,668,558. Reading lenses 10 are constructed to provide a correction in the range of 1.0 to 4.0 diopters, to provide near vision correction.

In the preferred embodiment, lenses 10 are affixed to the surface of lenses 14 using a water-activated adhesive, for example, the adhesive sold under the brand name Acrylic Adhesive No. 467 available from the 3M Corporation of Saint Paul, Minn. (3M Corporation). Preferably, as shown in FIGS. 1 and 2, lenses 10 are affixed to the forward-facing surface of lenses 14. Alternatively, the lenses may be affixed on the rearward-facing surface of the glass or plastic lenses. Furthermore, as shown in FIGS. 1 and 2, the lens 10 (as shown in its manufactured shape in FIG. 3) may be cut or shaped to fit the sunglass lenses 14.

It is further preferred that lenses 10 be sold in a kit with each kit having one pair of lenses or a particular correction. The kit also preferably includes a supply of the water-soluble adhesive useful for affixing the lenses 10 to lenses 14. Alternatively, lenses 10 may be coated on at least one side with the water-activatable adhesive prior to being placed in a kit for sale to the end user. This allows the lenses 10 to be attached to the lenses 14 by simply wetting the lenses and positioning them in place and allowing the adhesive to set. In either case, the kit also preferably includes instructions on how to apply the lenses to the sunglasses. Whether the adhesive is preapplied to the lenses 10 or included in the kit in a container and applied by the user prior to application of lenses 10 to lenses 14, it is preferred that the water-soluble adhesive takes sufficiently long to set to allow a user to move or slide the lenses around the surface of lenses 14 until the desired positioning is achieved. Once the desired position is achieved, the lenses 10 are left undisturbed until the adhesive sets. Once the adhesive is set, the lenses are "permanently" affixed to the non-prescription sunglasses until such time as an adhesive remover is applied to dissolve the adhesive and permit the removal of the lenses 10. This form of affixing is referred to herein as a "semi-permanent" attachment.

Such an adhesive remover is available from 3M Corporation, and is sold under the brand name Wood Grain Stripe Adhesive Remover (Part No. 09808). To remove the lenses 10, the adhesive remover is applied around the edges of the lens and gradually worked underneath it in order to loosen and break the adhesion of lenses 10 to lenses 14.

Reading lenses may be sized or shaped in any dimension sufficient to provide reading lenses correction on the lower half of the non-prescription sunglasses, while permitting viewing at a distance through the middle and upper portion of the sunglasses. As shown in FIGS. 1 and 2, it is preferable to provide reading lenses 10 with a straight surface which is positioned below the center viewing region of lenses 14.

In an alternate embodiment, more than one correction could be provided in the same lens 10, for instance to provide a trifocal effect. Such corrections would preferably be positioned in laterally extending zones of the lens 10, one for near vision correction, and another providing a correction for middle distance viewing. According to yet another alternative, lens 10 could be shaped to cover the lens 14 so as to provide correction for far distance viewing, with the correction provided in lens 10 adapted for correction at this distance.

Thus, as described above, the present invention provides a clear reading lens which may be semi-permanently attached to a non-prescription sunglass. Preferably, the reading lens is formed of a plastic membrane or film which provides the required diopter correction using microstructures. Such films or membranes are available from the 3M Corporation. Furthermore, the present invention provides that the microstructure lenses are affixed to the sunglass using a water-soluble adhesive. The lenses may be removed with an adhesive remover which is non-damaging to plastic or glass surfaces. In the alternative, it is contemplated that the reading lenses of the present invention, constructed using microstructure technology, could also be attached to a non-prescription sunglass using the same type of molecular attraction provided for by the Optx 20/20 sunglasses, without the use of adhesive, or with a permanent adhesive. In addition, lenses 10 could also be provided with a tint, if desired.

What is claimed is:

1. A plastic reading lens to be attached to a non-prescription sunglass wherein the reading lens provides a reading correction using microstructures in the reading lens.

2. A lens according to claim 1 further including a water-soluble adhesive applied to one surface of the lens to permit attachment of the lens to a non-prescription sunglass surface.

3. A method for providing a reading lens correction to a non-prescription sunglass comprising the steps of:

(a) providing a reading lens constructed of plastic with a reading correction created with microstructures; and (b) affixing the reading lens to the pair of non-prescription sunglasses using a water-soluble adhesive.

4. The method according to claim 3 further including the step of removing a lens affixed to a non-prescription sunglass using an adhesive remover which is non-damaging to plastic or glass.

5. A plastic lens to be attached to a non-prescription sunglass wherein the lens provides a vision correction using microstructures.

* * * * *